(12) United States Patent
Ould-Brahim

(10) Patent No.: US 8,190,772 B2
(45) Date of Patent: May 29, 2012

(54) APPARATUS AND METHOD FOR LAYER-2 AND LAYER-3 VPN DISCOVERY

(75) Inventor: Hamid Ould-Brahim, Kanata (CA)

(73) Assignee: Nortel Networks Limited, Mississauga (CA)

( * ) Notice: Subject to any disclaimer, the term of this patent is extended or adjusted under 35 U.S.C. 154(b) by 2475 days.

(21) Appl. No.: 10/747,346

(22) Filed: Dec. 29, 2003

(65) Prior Publication Data

US 2005/0198301 A1 Sep. 8, 2005

(51) Int. Cl.
*G06F 15/173* (2006.01)

(52) U.S. Cl. ........ 709/242; 709/238; 709/239; 709/240; 709/241

(58) Field of Classification Search .................. 709/242, 709/246, 238
See application file for complete search history.

(56) References Cited

U.S. PATENT DOCUMENTS

| | | | |
|---|---|---|---|
| 6,633,571 B1 * | 10/2003 | Sakamoto et al. | 370/401 |
| 2002/0069292 A1 * | 6/2002 | Gaddis et al. | 709/238 |
| 2003/0123446 A1 | 7/2003 | Muirhead et al. | |
| 2003/0142674 A1 | 7/2003 | Casey | |
| 2004/0076163 A1 * | 4/2004 | Ikeda | 370/395.53 |
| 2004/0174887 A1 * | 9/2004 | Lee | 370/395.53 |
| 2004/0258069 A1 * | 12/2004 | Serbest et al. | 370/395.1 |
| 2005/0044262 A1 * | 2/2005 | Luo | 709/238 |
| 2005/0091482 A1 * | 4/2005 | Gray et al. | 713/151 |
| 2005/0108379 A1 * | 5/2005 | Gray et al. | 709/223 |
| 2006/0013209 A1 * | 1/2006 | Somasundaram | 370/389 |
| 2006/0013232 A1 * | 1/2006 | Xu et al. | 370/396 |

FOREIGN PATENT DOCUMENTS

WO   WO 03/079614   9/2003

OTHER PUBLICATIONS

E. Rosen et al., "BGP/MPLS Virtual Private Networks", Mar. 1, 1999.
Senevirathne et al., "IETF Internet Draft: Auto-Discovery of VPLS Membership and Configuration Using BGP-MP". Internet Engineering Task Force Internet Draft, Feb. 2002.
Ould-Brahim et al. "Using BGP as an Auto-Discovery Mechanism for Provider-provisionhed VPNs", Internet Engineering Task Force, Internet Draft Provider Provisioned VPN WG, May 2003.
International Search Report.
Andersson, L. (Ed.), "PPVPN L2 Framework".
Awduche, D., et al., "RSVP-TE: Extensions to RSVP for LSP Tunnels".
Bates, T., at al., "Multiprotocol Extensions for BGP-4". Berger, L. (Ed.), "Generalized Multi-Protocol Label Switching (GMPLS) Signaling Resource ReserVation Protocol-Traffic Engineering (RSVP-TE) Extensions".
Martini, L., et al., "Pseudowire Setup and Maintenance using LDP".
Martini, L., et al., "Transport of Layer 2 Frames Over MPLS".
Ould-Brahim, H., et al., "GVPN: Generalized Provider-provisioned Port-based VPNs using BGP and GMPLS".
Ould-Brahim, H., et al., "Using BGP as an Auto-Discovery Mechanism for Network-based VPNs".
Rosen, E.C. et al., "Provisioning Models and Endpoint Identifiers in L2VPN Signalling".

* cited by examiner

*Primary Examiner* — John Follansbee
*Assistant Examiner* — Nghi Tran
(74) *Attorney, Agent, or Firm* — Ridout & Maybee LLP

(57) ABSTRACT

An apparatus and a method for layer-2 and layer-3 VPN discovery are disclosed. The apparatus is incorporated in a network, and the network includes a first carrier network. The first carrier network includes at least two layer-1 provider edge devices. Layer-1 VPN information is created within the first carrier network. BGP next hop information passes within the first carrier network. The BGP next hop information is for a selected one of the following: a layer-2 VPN-based provider edge device, a layer-3 VPN-based provider edge device, and a layer-2 and layer-3 VPN-based provider edge device. The network also includes a second carrier network within which the BGP next hop information is used for VPN discovery.

20 Claims, 2 Drawing Sheets

APPARATUS AND METHOD FOR LAYER-2 AND LAYER-3 VPN DISCOVERY

FIELD OF THE INVENTION

This invention relates to virtual private networks (VPNS) and, in particular, a method for layer-2 and layer-3 VPN auto-discovery using a generalized VPN auto-discovery mechanism.

BACKGROUND OF THE INVENTION

Many definitions of VPNs can be considered:

Definition 1: A VPN is a set of users (devices attached to the network) sharing common membership information and intended to establish inter-site connectivity (within that group). A user can be a member of multiple groups (VPNs).

Definition 2: A VPN is a client private network that subscribes to restricted connectivity services.

Definition 3: A VPN is a service where a customer requests multi-site connectivity services provided through a shared network infrastructure.

Definition 4: A VPN is a service where a partition of internal provider network resources is allocated to a customer.

Using specialized tunneling protocols and optionally secured encryption techniques, data integrity and privacy may be maintained in a VPN.

Categories of VPNs include layer-1, layer-2 and layer-3. "Layer-n" is in reference to the network layer used to perform the hand-off between the customer and provider network.

Layer-1 VPNs can be simple, point-to-point connections such as leased lines, ISDN links, or dial-up connections. They are known to b simple for the provider, as they place all responsibility for operating the network over the connection on the customer. In other words, the customer needs to provide and manage all the routing and switching equipment that operates over the connection.

Layer-2 VPN is a VPN in which the service provider connects customer sites using leased circuits connecting into a point of presence (POP) or node on a shared core network. Layer-2 VPNs are typically based on Frame Relay or ATM. Exemplary VPN mechanisms at layer-2 include virtual private LAN service (VPLS) (see Waldemar Augustyn et al, "Requirements for Virtual Private LAN Services (VPLS)", October 2002) and virtual private wire (VPW) (see Eric Rosen et al, "L-2 VPN Framework", February 2003).

Layer-3 VPN is a VPN in which the service provider supplies a leased circuit connection between the customer site and the nearest POP on the edge of the service provider network or manages customer routing on behalf of the customer. The service provider takes care of the routing and addressing of the customer traffic. The service provider distributes the IP addressing information for a company across all of its relevant sites. Exemplary VPN mechanisms at layer-3 include virtual routing (VR)—base mechanisms, such as VR using border gateway protocol (BGP) (see Hamid Ould-Brahim et al "Network-based IPN VPN Architecture using Virtual Routers", July 2002) or VPN-based RFC 2547 bis (see Eric Rosen, et al, "BGP/MPLS VPNs", October 2002).

There are various possible arrangements for unifying different types of VPNs. In one known network arrangement, two carriers are provided. The first carrier is a provider providing layer-2 or layer-3 VPN services. The second carrier is a sub-provider providing layer-1 or generalized VPN (GVPN) services. GVPN service (which in this case the first carrier subscribes to) is a VPN service that uses BGP as a VPN auto-discovery (VPN discovery is a process in which VPN routing information is distributed) and generalized multi-protocol label switching (GMPLS) (which will be discussed) as signaling and routing mechanisms.

The known methods for running this network arrangement have problems. Manual configuration is required for all the BGP-TCP sessions for the purpose of distributing layer-2/3 VPN information. Scaling problems also exist. The known provisioning model is a double-sided provisioning model.

SUMMARY OF THE INVENTION

The invention provides a network which allows scaling of the operational aspects of layer-2 and/or layer-1 MPLS-based VPN by scaling the operational aspects of the layer-2 and/or layer-3 VPN provider edge-based devices. Further, provides a network which simplifies the mode of operations on a layer-2/layer-3 VPN provider edge router or switch by eliminating the need for configuring the list of BGP next hops of the remote provider edge routers or switches. As well, the invention takes advantage of layer-1 VPN auto-discovery implemented on its carrier network by piggybacking layer-2/layer-3 BGP next hop information on top of it. Additionally, the network provides layer-1 VPN providers with the ability to offer added-value services that extend to layer-2/layer-3 VPN without requiring the layer-1 VPN provider to support and offer a complete suite of layer-2/layer-3 VPN services.

The present invention provides a network having the above features and additional advantages which will be evident in the reading of the description and drawings which follow.

According to a first aspect of the present invention, there is disclosed a network that includes a first carrier network. The first carrier network includes at least two layer-1 provider edge devices. Layer-1 VPN information is created within the first carrier network. BGP next hop information passes within the first carrier network. The BGP next hop information is for a selected one of the following: a layer-2 VPN-based provider edge device, a layer-3 VPN-based provider edge device, and a layer-2 and layer-3 VPN-based provider edge device. The network also includes a second carrier network within which the BGP next hop information is used for VPN discovery.

In the preferred embodiment, the BGP next hop information passes into the first carrier network as normal GVPN port information via one or more of the at least two layer-1 provider edge devices.

According to another aspect of the invention, there is disclosed a method for layer-2 and layer-3 VPN auto-discovery including the steps of:

(1) using BGP sessions and a discovery mechanism of a GVPN-based provider edge device to distribute BGP next hop information to a remote GVPN-based provider edge device;

(2) passing the BGP next hop information from the remote GVPN-based provider edge device to an attached provider edge device, the attached provider edge device being a selected one of the following: a layer-2 VPN-based provider edge device, a layer-3 VPN-based provider edge device, and a layer-2 and layer-3 VPN-based provider edge device; and (3) using the attached provider edge device in combination with the BGP next hop information to automatically create a set of BGP sessions thereby permitting a selected one of the following: layer-2 VPN discovery, layer-3 VPN discovery, and layer-2 and layer-3 VPN discovery.

In the preferred embodiment, the BGP next hop information is conveyed across a backbone during the step of using the BGP sessions and the discovery mechanism.

According to yet another aspect of the invention, there is disclosed a network including a backbone and at least two provider edge devices. The at least two provider edge devices are connected to and work with the backbone. Layer-1 VPN information is created within the network. BGP next hop information is also created within the network. The BGP next hop information is for a selected one of the following: a layer-2 VPN-based provider edge device, a layer-3 VPN-based provider edge device, and a layer-2 and layer-3 VPN-based provider edge device.

In the preferred embodiment, the network includes a layer-1 VPN service provider and a second VPN service provider. The second VPN service provider is a customer of the layer-1 VPN service provider. The second VPN service provider is a selected one of the following: a layer-2 VPN service provider, a layer-3 VPN service provider, and a layer-2 and layer-3 VPN service provider.

Further features and advantages will become apparent from the following detailed description taken in conjunction with the accompanying drawings.

DETAILED DESCRIPTION

Figure 1:
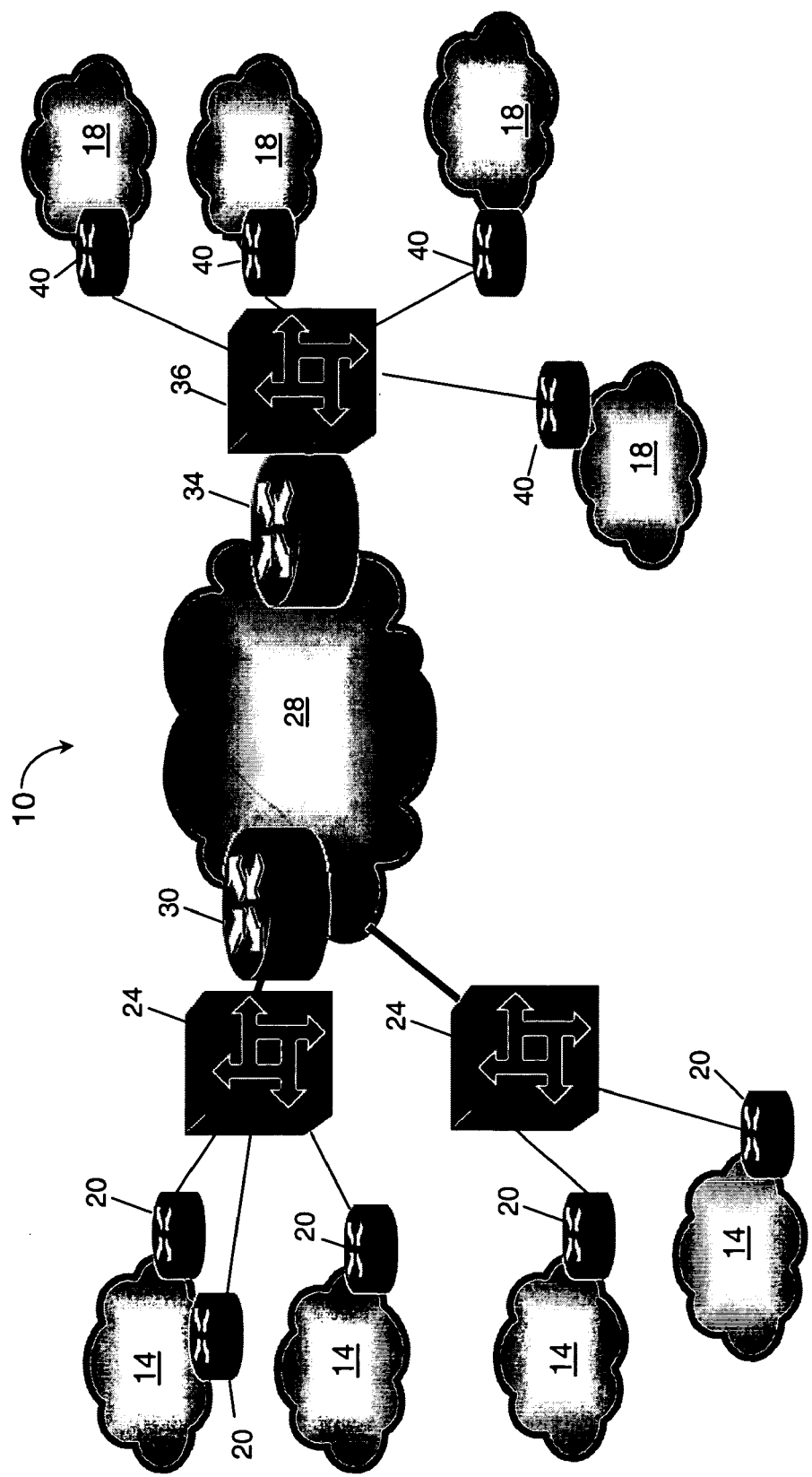
FIG. 1 is a schematic diagram illustrating a network reference model within which the apparatus and method of the invention can be utilized according to an embodiment of the invention.

Referring to FIG. 1, there is illustrated a network 10 connecting together VPNs 14 with remote VPNs 18. The VPNs 14 are customer networks which interface with a provider network via customer edge routers 20. Provider edge routers or switches 24 are associated with the provider network. The router 24 is a portion of the provider's network that interfaces with a particular VPN 14. This provider or first carrier provides layer-2 and/or layer-3 (L-2/3 or layer-2/3) VPN services to its customers.

The provider routers 24 also interface with a network 28 of a sub-provider or second carrier. The sub-provider's network 28 connects to the provider's network via a provider edge device 30. The device 30 is a portion of the network 28. Portions of the network 28 may also interface with a backbone. An example of a backbone would be an Internet backbone. Of course those skilled in the art will appreciate that other types of backbones are possible.

The second carrier provides GVPN services or layer-1 services to the first carrier. GVPN service is a provider-provisioned VPN service that uses BGP as a VPN auto-discovery mechanism. BGP is an important protocol for VPNs and the Internet. BGP is also an Internet standard for inter-domain autonomous system (AS) exterior routing. Furthermore, BGP is the routing protocol employed on the Internet. All Internet Service Providers must use BGP to establish routing between one another.

GVPN service also uses GMPLS as a signaling and routing mechanism. One way of defining GMPLS is as follows. In a multi-protocol label switching (MPLS) network, incoming packets are assigned a label by a label edge router. Packets are forwarded along a label switch path where each label switch router makes forwarding decisions based solely on the contents of the label. At each hop, the label switch router strips off the existing label and applies a new label which tells the next hop how to forward the packet. GMPLS extends MPLS from supporting packet (PSC) interfaces and switching to include support of the following three classes of interfaces and switching: time-division multiplex (TDM), lambda switch (LSC) and fiber-switch (FSC).

The remote side of the network 10 can have an arrangement substantially mirroring the proximate side. A provider edge device 34 interfaces the network 28 with a remote network of a layer-2/3 VPN service provider. This remote service provider has a provider edge router or switch 36. The router 36 interfaces the network of the layer-2/3 VPN service provider with the network 28.

The router 36 also interfaces the remote network of the layer-2/3 service provider with one or more of the remote VPNs 18. The VPNs 18 interface with the remote network of the layer-2/3 VPN service provider via customer edge routers 40.

With respect to the L-2/3 VPN provider edge routers used in the network 10, previous implementations required manual configuration of all BGP-TCP sessions for the purpose of distributing layer-2/3 VPN information. Furthermore, the previous implementations required each L-2/3 VPN provider edge router to be configured with all possible addresses used to establish the set of BGP sessions. This created a full mesh situation.

A full mesh is when every router in a group must be configured as a peer of every other router. When a group of routers (e.g. the L-2/3 VPN provider edge routers) need to be configured in a full mesh, scaling problems occur. Configuring in a full mesh causes scaling problems because the number of required connections grows quadratically with the number of routers involved.

In the preferred embodiment of the apparatus and method for layer-2 and layer-3 VPN discovery, BGP address information is communicated between an L-2/3 VPN provider edge router or switch and the sub-provider as normal GVPN port information. Furthermore, layer-1 VPN port information is used to discover the BGP next hop address information of the remote end router 40.

The concept of BGP next hop can be understood as follows. In BGP, the type of message used to advertise a route is called an update message. The update message contains an address prefix called a BGP next hop. Also, an IP address that is used to reach an advertising router is sometimes referred to as a BGP next hop attribute. Discovery of the BGP next hop address information of a remote end router using layer-1 VPN port information is absent from known solutions.

The preferred apparatus and method also differ from the previous implementations with respect to auto-discovery at the layer-1/GVPN-based provider edge device. In the previous implementations, BGP/TCP sessions were established for the purpose of distributing layer-1 VPN information. For auto-discovery at the layer-1/GVPN-based provider edge device in accordance with the invention, BGP/TCP sessions are established for the purpose of distributing both layer-1 VPN information and BGP next hop information for layer-2 and layer-3 VPN-based provider edge routers or switches.

Figure 2:
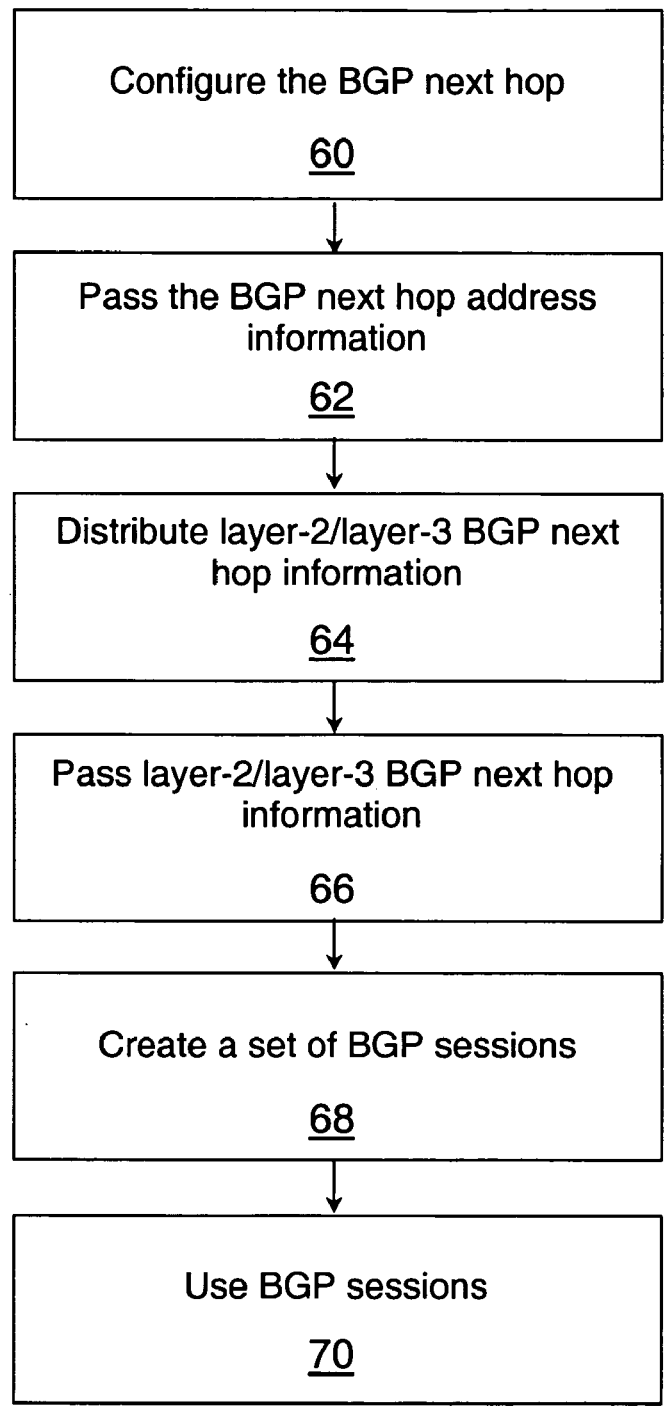
FIG. 2 is a flow diagram illustrating a method of operation implementable in the model of FIG. 1 according to an embodiment of the invention.

FIG. 2 is a flow diagram illustrating the preferred method of operation of layer-2/layer-3 VPN discovery. Starting at step 60, the BGP next hop is configured. The BGP next hop is used for the purpose of layer-2 and/or layer-3 VPN discovery at a layer-2/layer-3 VPN provider edge router or switch.

At step 62, a router or switch (such as the router 24 of FIG. 1) will pass the BGP next hop address information to a provider edge device (such as the device 30). This step is accomplished using normal GVPN customer edge-provider edge mechanisms.

At step 64, a provider edge device of the sub-provider uses its BGP sessions and discovery mechanisms to distribute the layer-2/layer-3 BGP next hop information. This information is distributed to all remote layer-1 provider edge devices.

At step 66, the remote layer-1 provider edge devices have received the layer-2/layer-3 BGP next hop information. This information is passed by the remote layer-1 provider edge devices to one or more attached layer-2/layer-3 provider edge routers or switches (such as the router 36 of FIG. 1).

At step 68, the router 36 automatically creates a set of BGP sessions to be used for the purpose of layer-2 and/or layer-3 VPN discovery.

Finally, at step 70, the created BGP sessions are used, and VPN discovery occurs.

GLOSSARY OF ACRONYMS USED

BGP—Border Gateway Protocol
GMPLS—generalized MPLS
GVPN—generalized VPN
L-2/3—layer-2 and/or layer-3
MPLS—multi-protocol label switching
VPLS—Virtual Private LAN Service
VPN—Virtual Private Network While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A network comprising:
   a first carrier network including at least two layer-1 provider edge devices;
   layer-1 VPN information created within said first carrier network;
   BGP next hop information passing within said first carrier network, said BGP next hop information for a selected one of the following:
     a layer-2 VPN-based provider edge device,
     a layer-3 VPN-based provider edge device, and
     a layer-2 and layer-3 VPN-based provider edge device;
   a second carrier network within which said BGP next hop information is used for VPN discovery.

2. A network as claimed in claim 1 wherein a backbone separates said at least two provider edge devices.

3. A network as claimed in claim 2 wherein said at least two layer-1 provider edge devices are GVPN-based or these devices implement a VPN auto-discovery mechanism.

4. A network as claimed in claim 2 wherein said backbone includes a portion of the Internet.

5. A network as claimed in claim 3 wherein said BGP next hop information passes into said first carrier network as normal GVPN port information via one or more of said at least two layer-1 provider edge devices.

6. A network as claimed in claim 5 wherein said second carrier network includes a provider edge device that is a selected one of the following: a layer-2 VPN-based provider edge device, a layer-3 VPN-based provider edge device, and a layer-2 and layer-3 VPN-based provider edge device.

7. A method for layer-2 and layer-3 VPN auto-discovery comprising the steps of:
   using BGP sessions and a discovery mechanism of a GVPN-based provider edge device to distribute BGP next hop information to a remote GVPN-based provider edge device;
   passing said BGP next hop information from said remote GVPN-based provider edge device to an attached provider edge device, said attached provider edge device being a selected one of the following: a layer-2 VPN-based provider edge device, a layer-3 VPN-based provider edge device, and a layer-2 and layer-3 VPN-based provider edge device; and
   using said attached provider edge device in combination with said BGP next hop information to automatically create a set of BGP sessions thereby permitting a selected one of the following: layer-2 VPN discovery, layer-3 VPN discovery, and layer-2 and layer-3 VPN discovery.

8. A method as claimed in claim 7 further comprising the step of passing said BGP next hop information to said GVPN-based provider edge device from a proximate provider edge device before the step of using said BGP sessions and said discovery mechanism.

9. A method as claimed in claim 8 wherein said proximate provider edge device is a selected one of the following: a layer-2 VPN-based provider edge device, a layer-3 VPN-based provider edge device, and a layer-2 and layer-3 VPN-based provider edge device.

10. A method as claimed in claim 9 further comprising the step of configuring said BGP next hop information at said proximate provider edge device before the step of passing said BGP next hop information to said GVPN-based provider edge device.

11. A method as claimed in claim 10 wherein said BGP next hop information is conveyed across a backbone during said step of using said BGP sessions and said discovery mechanism.

12. A method as claimed in claim 11 wherein said backbone includes a portion of the Internet.

13. A method as claimed in claim 12 wherein said BGP next hop information is communicated as normal GVPN port information during said step of passing said BGP next hop information to said GVPN-based provider edge device.

14. A method as claimed in claim 9 wherein said proximate provider edge device interfaces with a VPN.

15. A network comprising:
   a backbone;
   at least two provider edge devices connected to and working with said backbone;
   layer-1 VPN information created within said network; and
   BGP next hop information created within said network, said BGP next hop information for a selected one of the following: a layer-2 VPN-based provider edge device, a layer-3 VPN-based provider edge device, and a layer-2 and layer-3 VPN-based provider edge device.

16. A network as claimed in claim 15 wherein said BGP next hop information is conveyed across said backbone.

17. A network as claimed in claim 16 wherein said at least two provider edge device are GVPN-based.

18. A network as claimed in claim 16 wherein said backbone includes a portion of the Internet.

19. A network as claimed in claim 17 further comprising:
   a layer-1 VPN service provider having its own network, said layer-1 VPN service provider network including said backbone; and
   a second VPN service provider that is a customer of said layer-1 VPN service provider, said second VPN service provider being a selected one of the following: a layer-2 VPN service provider, a layer-3 VPN service provider, and a layer-2 and layer-3 VPN service provider, wherein said second VPN service provider has its own network which sends BGP address information as normal GVPN port information via one or more of said at least two provider edge devices to said layer-1 VPN service provider network.

20. A network as claimed in claim 19 wherein said second VPN service provider network includes a provider edge device for passing said BGP address information.

* * * * *